United States Patent [19]
Sugawara

[11] Patent Number: 6,057,951
[45] Date of Patent: May 2, 2000

[54] OPTICAL RECEIVING CIRCUIT

[75] Inventor: Mitsuru Sugawara, Tokyo, Japan

[73] Assignee: Kabushiki Kaisha Toshiba, Kawasaki, Japan

[21] Appl. No.: 08/656,051

[22] Filed: May 31, 1996

[30] Foreign Application Priority Data

Jun. 1, 1995 [JP] Japan ..................... 7-135226

[51] Int. Cl.[7] ................................. H04B 10/06
[52] U.S. Cl. ........................... 359/194; 359/189
[58] Field of Search ................... 359/177, 189, 359/194, 195, 176, 174, 179; 250/214 A, 214 AG

[56] References Cited

U.S. PATENT DOCUMENTS 5,701,195  12/1997  Chikama .................... 359/177
5,764,404   6/1998  Yamane et al. ............. 359/341

FOREIGN PATENT DOCUMENTS

2 247 582  3/1992  United Kingdom.
2 287 148  9/1995  United Kingdom.
2 289 586 11/1995  United Kingdom.

*Primary Examiner*—Jason Chan
*Attorney, Agent, or Firm*—Oblon, Spivak, McClelland, Maier & Neustadt, P.C.

[57] ABSTRACT

In an optical receiver circuit in which an optical input signal is amplified by an optical amplifier and converted to an electrical signal by optical detector, and the amplified optical signal is amplified by an equalization amplifier so as to obtain an optical received signal, an output peak level of the equalization amplifier is detected by a peak detection circuit, an error difference of the peak level is amplified by an error amplification circuit, and a gain of the optical fiber amplifier is controlled by a gain control circuit, thereby fixing a level of the received signal. In the above-mentioned structure, an input signal loss detection circuit detects an input signal loss from an output of the peak detection circuit, and the gain of the optical fiber amplifier is controlled by the gain control circuit to be sufficiently lower than the maximum gain at the time of the detection. Thereby, even in a case where a level of the optical input signal abruptly increases from the input signal loss, damage of an optical detector and saturation of a receiving electric circuit can be prevented, so that the circuit can be operated again.

17 Claims, 10 Drawing Sheets

OPTICAL RECEIVING CIRCUIT

BACKGROUND OF THE INVENTION

1. Field of the Invention

The present invention relates to an optical receiver circuit using an optical amplifier as a preamplifier.

2. Description of the Related Art

As is already known, an optical fiber amplifier using an optical fiber doped with rare earth elements such as erbium (Er), etc., as an optical amplifying medium has the characteristics of low noise, high gain and a good matching with a transmission fiber. Accordingly, research and development in the field has been actively pursued since it promises a simple and reliable method of increasing the transmission distance. Particularly, an optical receiver, employing an optical fiber amplifier as a preamplifier, greatly improves sensitivity and dynamic range.

Figure 1:
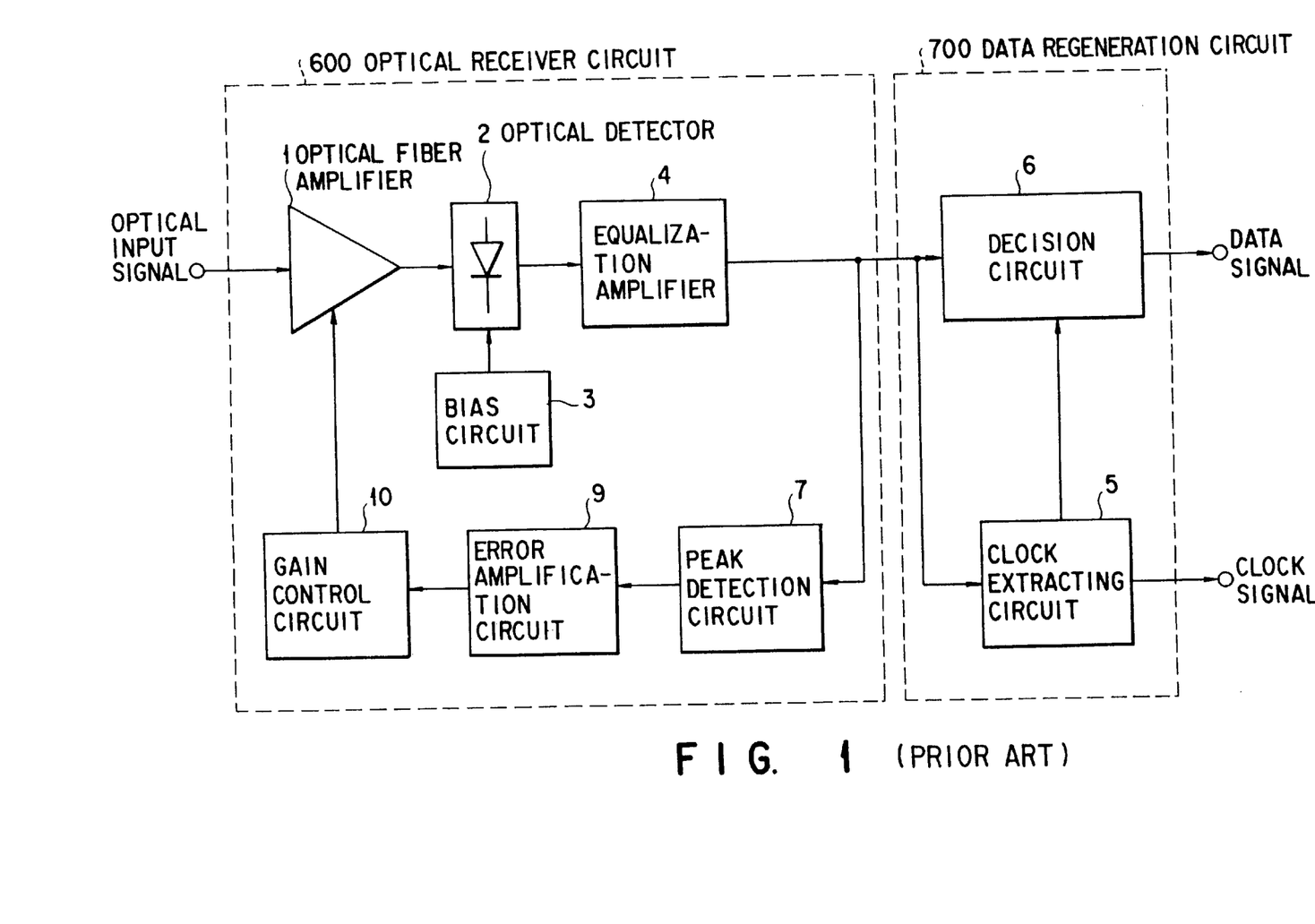
FIG. 1 is a block circuit diagram showing the structure of a conventional optical receiver having an optical receiver circuit.

FIG. 1 shows the structure of a conventional optical receiver. The optical receiver comprises an optical receiver circuit 600 and a data regeneration circuit 700.

An optical signal input to the optical receiver circuit 600 is supplied to a gain controlled optical amplifier 1, which functions as a preamplifier. In the gain controlled optical amplifier 1, for example, a pump laser drive current is changed, so that an arbitrary gain can be set. Then, an optical input signal is amplified by the set gain so as to be coupled to an optical detector 2 as an optical output signal.

An inverse bias voltage is applied onto the optical detector 2 by a bias circuit 3, and the optical output signal is converted to an electrical signal. The electrical signal is amplified up to a necessary level by an equalization amplifier 4. The output signal of the equalization amplifier 4 is supplied to the data regeneration circuit 700 as a received signal, and a peak detection circuit 7.

The peak detection circuit 7 detects a peak level of the received signal, and a peak detection signal obtained by the circuit 7 is supplied to an error amplification circuit 9. The error amplification circuit 9 obtains an error of the peak detection signal against a predetermined reference level. Then, the error amplification circuit 9 amplifies the error to be output to a gain control circuit 10 as an error signal.

The gain control circuit 10 increases or reduces the pump laser drive current of the optical fiber amplifier 1 such that the error signal becomes zero, thereby the gain of the optical fiber amplifier 1 is controlled. As mentioned above, in the optical receiver circuit 600, the gain of the optical fiber amplifier 1 is increased or reduced in accordance with the change of the peak level of the received signal, so that the peak level of the received signal is stabilized.

The received signal stabilized by the optical receiver circuit 600 is supplied to the data regeneration circuit 700 which consists of a clock extraction circuit 5 and a decision circuit 6.

The clock extraction circuit 5 extracts a clock signal for data decision from the received signal. Then, the extracted clock signal is sent to the decision circuit 6. The decision circuit 6 determines the level of the received signal using the extracted clock signal so as to regenerate a data signal.

Figure 2:
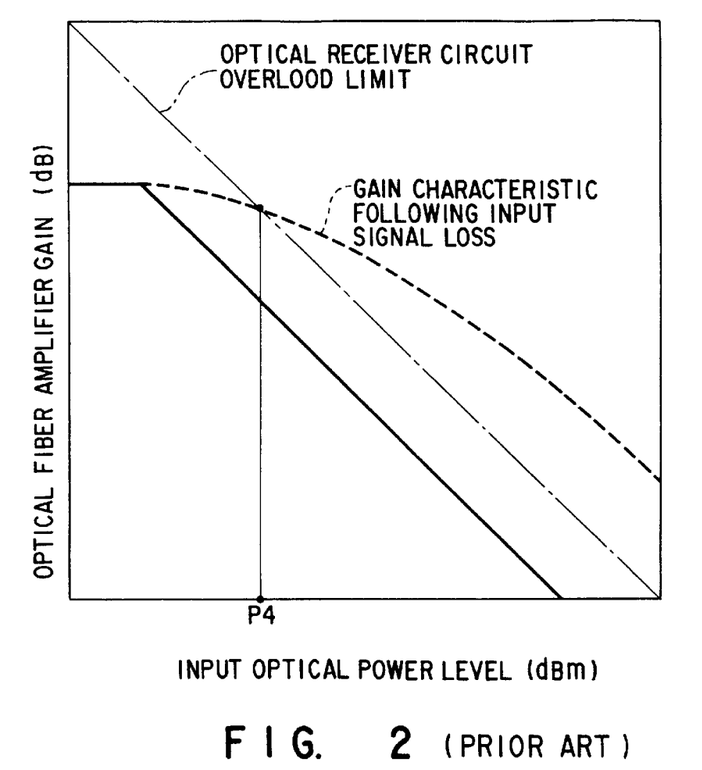
FIG. 2 is a characteristic view showing the relationship between an input optical power level and an optical fiber amplifier gain in order to explain a gain control operation of the conventional optical receiver circuit.
Figure 3:
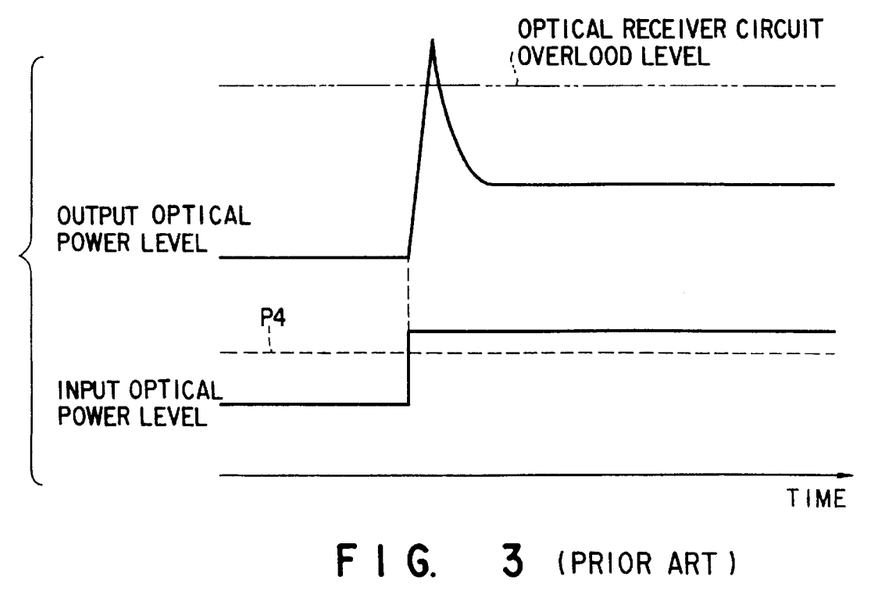
FIG. 3 is a view showing a power level waveform of optical input signal and that of optical output signal in order to explain the gain control operation of the conventional optical receiver circuit.
Figure 4:
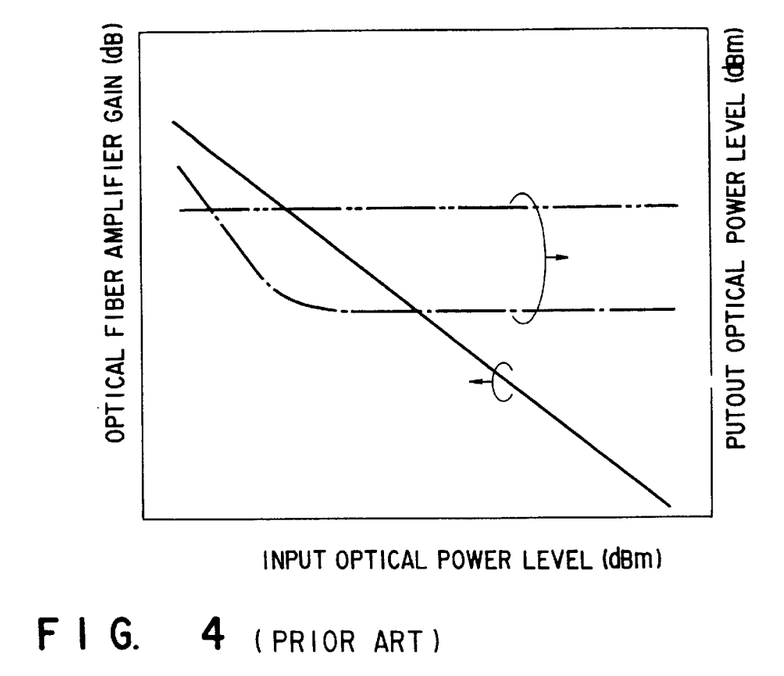
FIG. 4 is a characteristic view showing the relationship between an input optical power level and an optical fiber amplifier gain and the relationship between the input optical power and an output optical power level in order to explain a gain control operation of the conventional optical receiver circuit.

The following will explain an operation of a gain control of the above-structured optical receiver circuit 600 with reference to FIGS. 2 and 3.

In FIG. 2, the solid line shows an optical fiber amplifier gain (dB) 1 against the input optical power level (dBm) of the optical receiver circuit 600, and the dot-dash line shows the optical receiver circuit overload limit is equal to the maximum receiving optical level.

As is obvious from the figure, the optical fiber amplifier 1 is controlled such that the gain becomes small if the input optical power level increases, and the gain becomes large if the input optical power level decreases. Due to this, even if the level of the optical input signal changes, a stabilized received signal can be obtained by the optical receiver circuit 600. As a result, data can be surely decided and regenerated by the data regeneration circuit 700.

However, in the above-structured optical receiver circuit 600, in a case of an input signal loss in which the level of the optical input signal becomes lower than a certain level, for example, disconnection of an optical signal input connector, the gain control works such that the gain of the optical fiber amplifier 1 becomes maximum.

Under the maximum gain state, a gain of the optical fiber amplifier 1 does not become constant against the input optical power level by a saturation characteristic, which the amplifier has, as shown in a broken line of FIG. 2. In this state, the output of the optical fiber amplifier 1 exceeds the optical receiver circuit overload limit 600 as shown in the dot-dash line of FIG. 2.

Due to this, as shown in FIG. 3, if the input optical power level abruptly increases higher than a reference level P4 from the input signal loss level, the output of the optical fiber amplifier 1 exceeds the maximum receiving optical level of the optical receiver circuit 600 since the gain of the optical fiber amplifier 1 becomes maximum. At this time, for example, an optical signal having excessive optical power is made incident onto the receiving optical element 2, there is the possibility that the receiving optical element 2 will be damaged.

Also, if the optical power level of the optical input signal is reduced, the rate of optical noise in the optical output signal is increased in accordance with increase in the gain of the optical fiber amplifier 1. Due to this, if the gain of the optical fiber amplifier 1 is controlled such that the peak level of the received signal is fixed by the the gain control circuit 10, the optical power level of the optical output signal increases as the optical power level of the optical input signal decreases. Therefore, if the optical power level of the optical input signal continues to decrease, the output optical power level of the optical fiber amplifier 1 continues to increase and exceeds the maximum receiving optical level of the optical receiver circuit 600. As a result, an abnormal operation may be generated in the circuit or the circuit may be damaged.

The prior art of FIG. 1 explained the case of the output level detecting system of the optical fiber amplifier 1 after the conversion from optical signal to the received signal, which is converted to the electrical signal. However, there is a system in which a part of the optical output signal of the optical fiber amplifier 1 is divided before the received signal is converted to the electrical signal so as to detect the output optical power level. Even in this system, in a case where the optical signal is input again from the input signal loss, there is generated a problem in which the optical receiver circuit will be damaged or the circuit cannot be started again, depending on the case.

SUMMARY OF THE INVENTION

As mentioned above, in the conventional optical receiver circuit, the preamplifier is set to be in the maximum gain state at the time of the input signal loss. Due to this, if the optical signal having high level is abruptly input, the output level may exceed the maximum receiving optical level of the optical receiver circuit.

Also, in the case where the gain of the optical amplifier increases in accordance with decrease in the power level of the optical input signal, the gain control circuit controls the gain of the optical fiber amplifier such that the peak level of the received signal is fixed in spite of the fact that the rate of optical noise in the optical output signal is increased. Due to this, there is generated a problem in which the power level of the optical signal output from the optical fiber amplifier increases, and the output level of the optical fiber amplifier may exceed the maximum receiving optical level.

As mentioned above, if the output level of the optical output signal of the optical amplifier exceeds the maximum receiving optical level, there is generated a problem in which the optical detector will be damaged or the optical detector cannot be started again by saturation of the optical detector.

In order to solve the above-mentioned problems, an object of the present invention is to provide an optical receiver circuit in which the damage of an optical detector and saturation of the optical detector can be prevented such that an output level of an optical signal output from an amplifier does not exceed an optical receiver circuit overload level.

In order to achieve the above object, according to the present invention, there is provided an optical receiver circuit comprising an optical amplifier for amplifying an optical input signal; a gain control circuit for controlling a gain of the optical amplifier; photoelectric converting means for converting an optical signal output from the optical amplifier to an electrical signal; first gain control means for controlling the gain of the optical amplifier through the gain control circuit such that a level of the electrical signal output from the photoelectric converting means is set to a defined level; input signal loss detection means for detecting the input signal loss of the optical input signal; and second gain control means for controlling the gain of the optical amplifier to be lower than a maximum gain through the gain control circuit when the input signal loss is detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The following will specifically explain the first to fourth embodiments of the present invention with reference to the drawings.

(First Embodiment)

Figure 5:
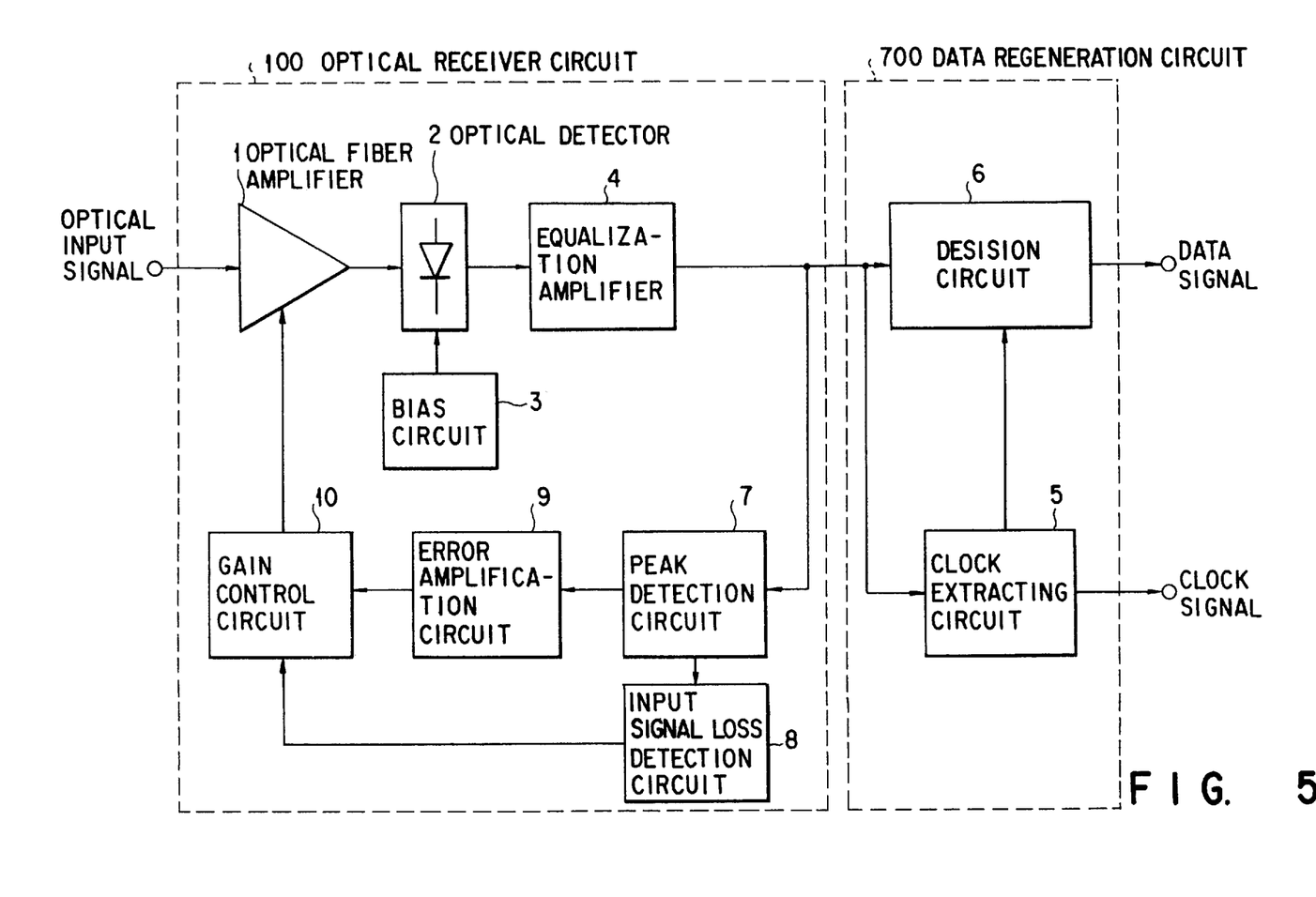
FIG. 5 is a block circuit diagram showing the structure of an optical receiver having an optical receiver circuit of a first embodiment of the present invention.
Figure 6:
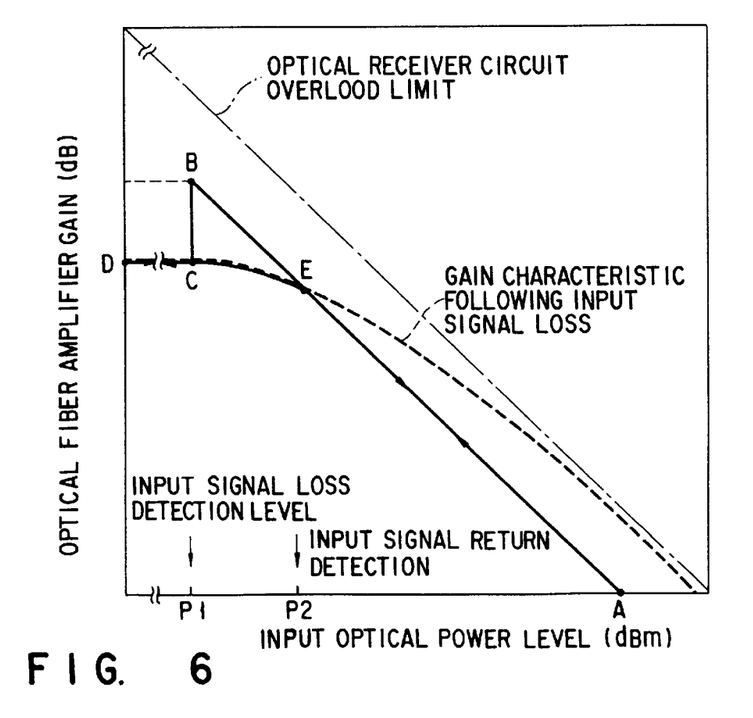
FIG. 6 is a characteristic view showing the relationship between an input optical power level and an optical fiber amplifier gain in order to explain a gain control operation of the first optical receiver circuit of the present invention.

First, the following will explain the first embodiment of the present invention with reference to FIGS. 5 and 6.

FIG. 5 shows the structure of the optical receiving system of the present invention. Similar to the conventional optical receiver, the optical receiving system of the present invention comprises an optical receiver circuit 100 and a data regeneration circuit 700.

A optical signal input to the optical receiver circuit 100 is supplied to a gain control type optical fiber amplifier 1 serving as a preamplifier. In the gain controlled optical amplifier 1, a pump laser drive current is changed, so that an arbitrary gain can be set. Then, an optical input signal is amplified by the set gain so as to be guided to an optical detector 2 as an optical output signal.

An inverse bias voltage is applied onto the optical detector 2 by a bias circuit 3, and the optical output signal is converted to an electrical signal. The electrical signal is amplified up to a necessary level by an equalization amplifier 4. An output signal of the equalization amplifier 4 is supplied to the data regeneration circuit 700 as a received signal, and a peak detection circuit 7.

The peak detection circuit 7 detects a peak level of the received signal, and a peak detection signal obtained by the circuit 7 is supplied to an error amplification circuit 9, and an input signal loss detection circuit 8.

The error amplification circuit 9 obtains an error of the peak detection signal against a predetermined reference level. Then, the error amplification circuit 9 amplifies the error to be output to a gain control circuit 10. Also, when the level of the peak detection signal is lower than an input signal loss detection level, the input signal loss detection circuit 8 judges the level of the peak detection signal as an input signal loss level, and continues to output an input signal loss detection signal until the level of the peak detection signal is higher than an input signal return detection level, which is set to be higher than the input signal loss detection level. The input signal loss detection signal output from the input signal loss detection circuit 8 is sent to the gain control circuit 10.

In this case, the input signal loss detection level is set to be a data regeneratable peak level. Then, the input signal return detection level is set to a level in which a gain control loop against the optical fiber amplifier 1 immediately responds when the optical signal is input again.

In a case of a normal operation state, that is, a state that no input signal loss detection signal is supplied, the gain control circuit 10 reduces the pump laser drive current of the optical fiber amplifier 1 such that an output of the error amplification circuit 9 becomes zero, thereby the gain of the optical fiber amplifier 1 is controlled. In a case of an input signal loss, that is, a state that an input signal loss detection signal is supplied, the drive current is fixed such that the gain of the optical fiber amplifier 1 is lower than the maximum gain to a certain extent.

The received signal stabilized by the optical receiver circuit 100 is supplied to the data regeneration circuit 700 which consists of a clock extraction circuit 5 and a decision circuit 6.

The clock extraction circuit 5 extracts a clock signal for data decision from the received signal. Then, the extracted clock signal is sent to the decision circuit 6. The decision circuit 6 determines the level of the received signal using the extracted clock signal so as to regenerate a data signal.

According to the above-structured optical receiver, in the optical receiver circuit 100, the gain of the optical fiber amplifier 1 of the input stage is controlled such that the peak level of the received signal is fixed in the normal optical signal input state and is set to be lower than the maximum gain in the input signal loss.

The following will explain a gain control operation of the above-structured optical receiver circuit 100 with reference to FIG. 6.

In FIG. 6, a solid line shows an optical fiber amplifier gain (dB) 1 against an input optical power level (dBm) of the optical receiver circuit 100, and dot-dash line shows an optical receiver circuit overload limit 100, similar to the case of FIG. 2.

If the input optical power level is changed from a high input state to a low input state, the gain of the optical fiber amplifier 1 is linearly controlled along a solid line connecting point A to point B of FIG. 6 such that the level of the received signal is fixed.

However, if the input optical power level is reduced to an input signal loss detection level P1, the gain of the optical fiber amplifier 1 is set to be point C of FIG. 6, which is lower than point B of the maximum gain state since the input signal loss detection signal is output from the input signal loss detection circuit 8.

There is an area in which the gain in the input signal loss exceeds the gain in the normal gain control state. In this case, the gain obtained at point C is set to a following value, which does not exceed the following condition.

More specifically, the condition is that the characteristic of the gain of the optical fiber amplifier 1 in the input signal loss is set to not exceed the optical receiver circuit overload level shown by a dot-dash line of FIG. 6 in the range of the input optical power level, which the optical detector 2 needs, as shown by a dashed line of FIG. 6.

The following will explain the gain control characteristic of the optical fiber amplifier 1 in the case that the input optical power level increases from a level, which is lower than input signal loss detection level P1 under the above-set condition.

First, in the output state of the input signal loss detection signal, the gain of the optical fiber amplifier 1 is reduced from the maximum gain so that the pump laser drive current is fixed. Due to this, in FIG. 6, the gain, which is obtained when the input optical power level is zero, is set to point D, which has almost same gain as point C.

In FIG. 6, point E is an intersection where the above-motioned dashed line intersects the solid line showing the normal operation state. Then, the input optical power level, which is obtained at point E, is input signal return detection level P2.

The gain of the optical fiber amplifier 1 is changed from point D to point E along the dashed line when the input when the input optical power level ranges from zero to P2. When the input optical power level reaches input signal return detection level P2, the gain reaches point E, and the control in the input signal loss is released. At this time, the gain, which is enough to fix the level of the received signal, can be obtained, so that the operation returns to the normal control operation without fail.

In other words, in the above-structured optical receiver circuit 100, if the input signal loss in which the input optical power level is lower than input signal loss detection level PI is detected, the gain of the optical fiber amplifier 1 is set to the value, which does not exceed the optical receiver circuit overload level 100. Due to this, even if an excessive optical signal is input to the optical receiver circuit 100 later, the optical detector 2 is not damaged. Moreover, since no saturation of the receiving electric circuit is generated, the circuit can be operated again from the input signal loss.

The present invention is not limited to the above-mentioned embodiment. In the above embodiment, the input signal loss was detected from the peak level of the received signal. However, for example, the input signal loss may be detected from the optical input signal of the optical fiber amplifier 1 or the power level of the optical output signal, thereby controlling the gain.

(Second Embodiment)

Figure 7:
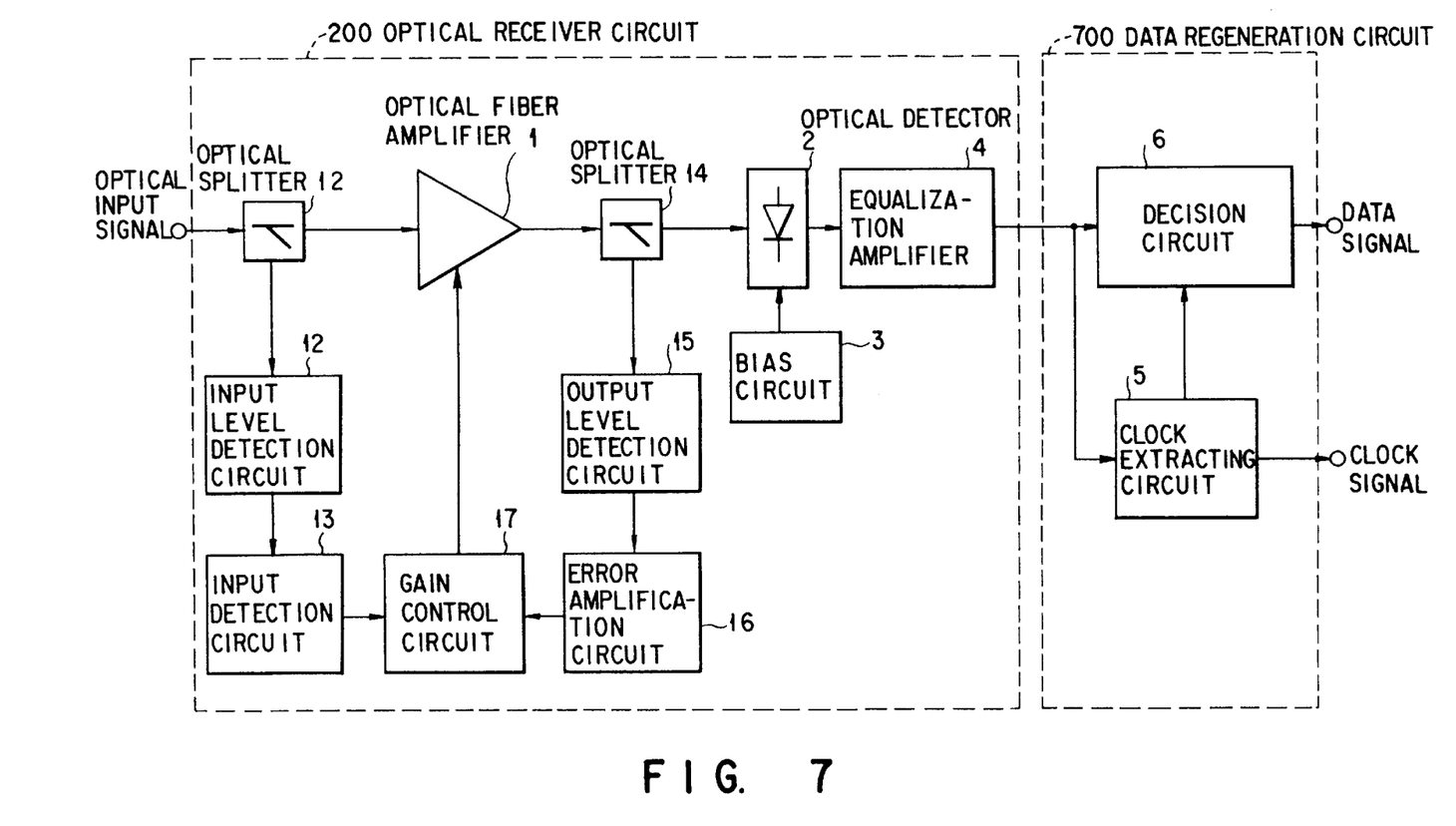
FIG. 7 is a block circuit diagram showing the structure of an optical receiver having an optical receiver circuit of a second embodiment of the present invention.
Figure 8:
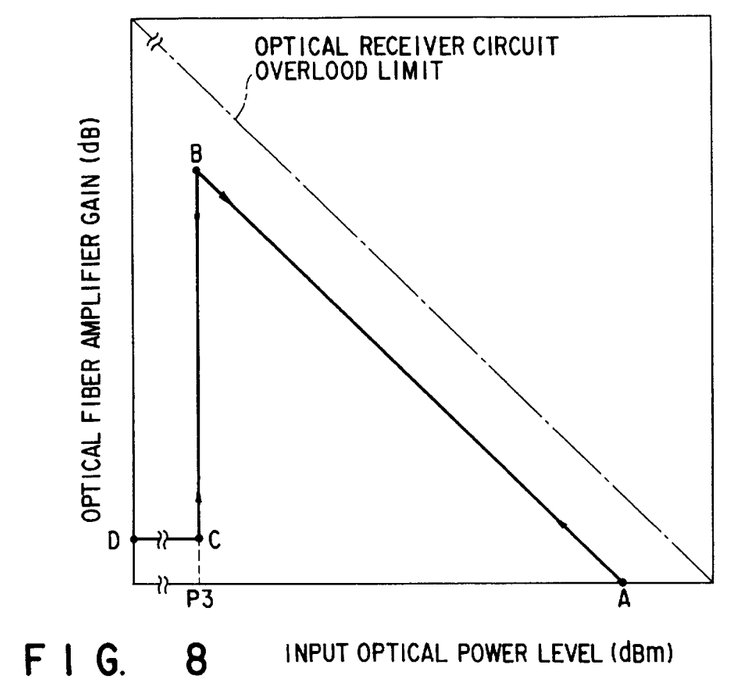
FIG. 8 is a characteristic view showing the relationship between an input optical power level and an optical fiber amplifier gain in order to explain a gain control operation of the second optical receiver circuit of the present invention.

The following will explain the second embodiment of the present invention with reference to FIGS. 7 and 8.

FIG. 7 shows the structure of the optical receiver of the present invention. The optical receiver comprises an optical receiver circuit 200 and a data regeneration circuit 700. In FIG. 7, the same reference numerals are added to the portions common to FIG. 5, only the portions, which are different from FIG. 5, will be explained.

A part of an optical signal input to the optical receiver circuit 200 is divided by an optical splitter 11 so as to be guided to an input level detection circuit 12. On the other hand, an optical input signal passed through the optical splitter 11 is coupled to the optical fiber amplifier 1.

The input level detection circuit 12 converts the optical input signal divided by the optical splitter 11 to an electrical signal so as to detect the power level of the optical input signal. The detected power level is sent to an input signal loss detection circuit 13 as an input optical power level signal. If the input optical power level is lower than a predetermined input signal loss detection level P3, the input signal loss detection circuit 13 judges the input optical power level as an input signal loss, and outputs an input signal loss detection signal. In this case, an input signal return detection level is set to the same as input signal loss detection level P3. The obtained input detection signal is sent to a gain control circuit 17.

On the other hand, the optical input signal passed through the optical splitter 11 is amplified by the optical fiber amplifier 1 based on a gain, which is set by the gain control circuit 17 to be described later, and supplied to a second optical splitter 14 as an optical output signal. The optical splitter 14 divides a part of the optical output signal to be coupled to the optical detector 2. Then, the passed optical output signal is coupled to an output level detection circuit 15.

The output level detection circuit 15 converts the divided optical signal to an electrical signal so as to detect the power level of the optical output signal. The power level of the optical output signal is supplied to an error amplification circuit 16 as an output optical power level signal. The error amplification circuit 16 obtains an error between the output optical power level signal and a predetermined reference level, and amplifies an error signal so as to be output. The obtained signal is sent to the gain control circuit 17.

The input signal loss detection signal of the input signal loss detection circuit 13 and the error signal of the error amplification circuit 16 are supplied to the gain control circuit 17. In this case, in the normal operation state in which no input signal loss detection signal is supplied (the power level of input optical is higher than input signal loss detection level P3), the pump laser drive current of the optical fiber amplifier 1 is reduced such that the output of the error amplification circuit 16 becomes zero so as to control the gain. In the abnormal operation state in which the input signal loss detection signal is supplied (the power level of input optical is lower than input signal loss detection level P3), the laser drive current is fixed such that the gain of the optical fiber amplifier 1 becomes a predetermined value, which is lower than the maximum gain.

An inverse bias voltage is applied onto the optical detector 2 by the bias circuit 3, and the output optical signal passed through the optical divider 14 is converted to an electrical signal. The electrical signal is amplified up to a necessary level by an equalization amplifier 4, to be supplied to the data regeneration circuit 700.

The following will explain a gain control operation of the above-structured optical receiver circuit 200 with reference to FIG. 8.

In FIG. 8, a solid line shows an optical fiber amplifier (dB) 1 against an input optical power level (dBm) of the optical receiver circuit 200, and dot-dash line shows an optical receiver circuit overload limit 200, similar to the cases of FIGS. 2 and 6.

If the input optical power level is changed from a high input state to a low input state, the gain of the optical fiber amplifier 1 is linearly controlled along a solid line connecting point A to point B of FIG. 8 such that the output optical power level, which is before the conversion of the signal to the electrical signal, is fixed.

However, if the input optical power level is reduced to input signal loss detection level P3, the input signal loss detection circuit 13 judges the state as an input signal loss, and the gain of the optical fiber amplifier 1 is set to be point C from point B of the maximum gain state of FIG. 8. At this time, unlike the first embodiment, the input signal loss detection circuit 13 judges whether or not the present state is the input signal loss at the input side of the optical fiber amplifier 1. Due to this, in the input signal loss, the gain of the optical fiber amplifier 1 is set to zero so that the optical output signal is intercepted. Then, at the time of inputting the optical signal again, the gain control in the input signal loss state is released at the same level as the input signal loss detection level, so that the optical signal can be immediately returned to the normal state from the input signal loss.

In other words, in the above-structured optical receiver circuit 200, if the input signal loss in which the input optical power level is lower than input signal loss detection level P3 is detected, the gain of the optical fiber amplifier 1 is set to the value, which does not exceed the optical receiver circuit overload level 200. Due to this, even if an excessive optical signal is input to the optical receiver circuit 200 later, the optical detector 2 is not damaged. Moreover, since no saturation of the receiving electric circuit is generated, the circuit can be operated again from the input signal loss.

The present invention is not limited to the above-mentioned embodiment. The above embodiment explained that the input signal loss was detected from the optical input signal of the optical fiber amplifier 1. However, for controlling the gain of the optical fiber amplifier 1, the input signal loss can be detected from the power level of the optical output signal, which the output level detection circuit 15 detects, or from the output signal of the equalization amplifier 4. Thereby, the same advantage as the first embodiment can be obtained.

Moreover, even in the structure having the control loop for stabilizing the output signal of the equalization amplifier 4 as shown in the first embodiment, the input signal loss is detected from the optical input signal of the optical fiber amplifier 1 so as to control the gain of the optical fiber amplifier 1 similar to the second embodiment. Thereby, it is needless to say that the same advantage as the second embodiment can be obtained.

(Third Embodiment)

Figure 9:
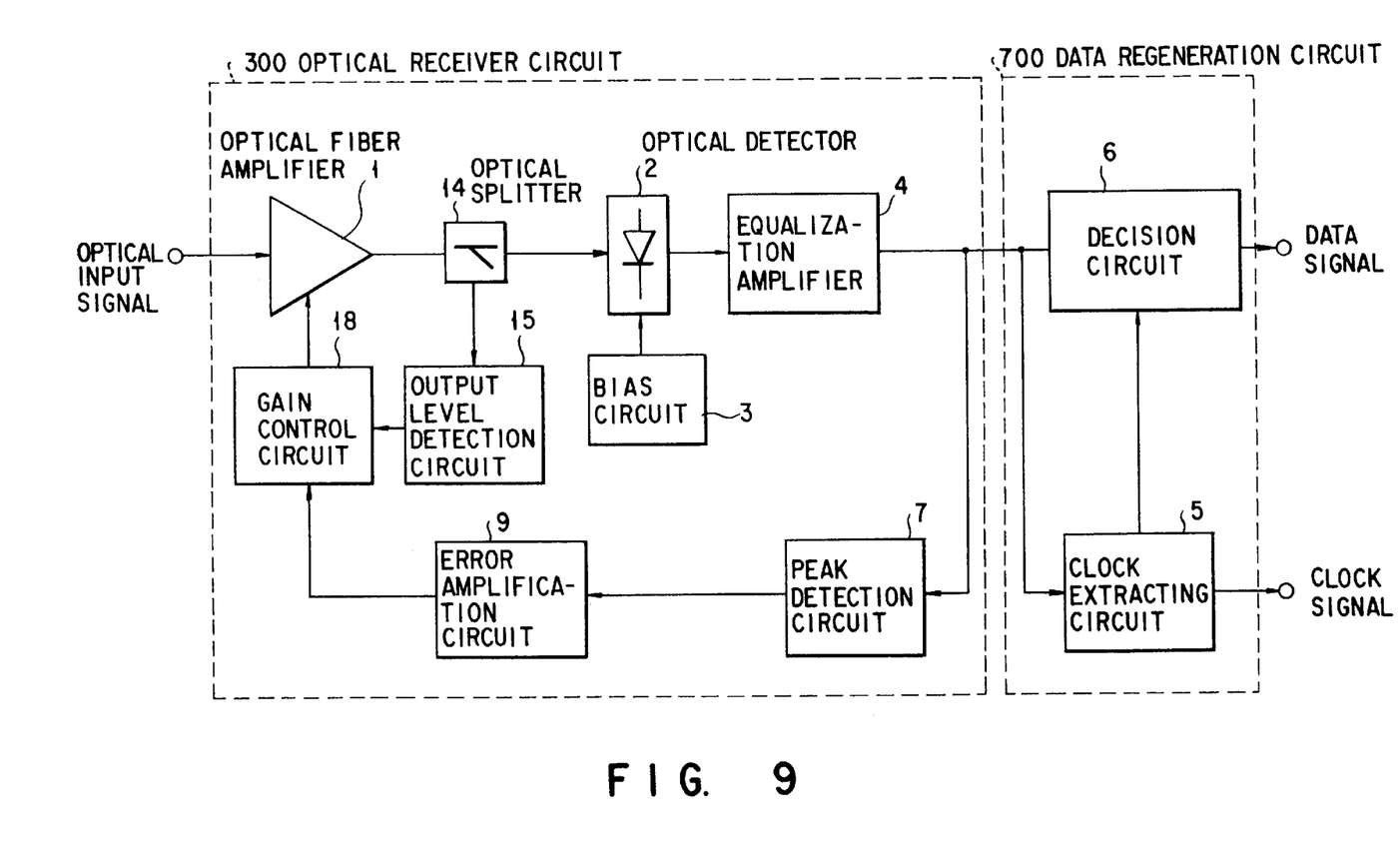
FIG. 9 is a block circuit diagram showing the structure of an optical receiver having an optical receiver circuit of a third embodiment of the present invention.
Figure 10:
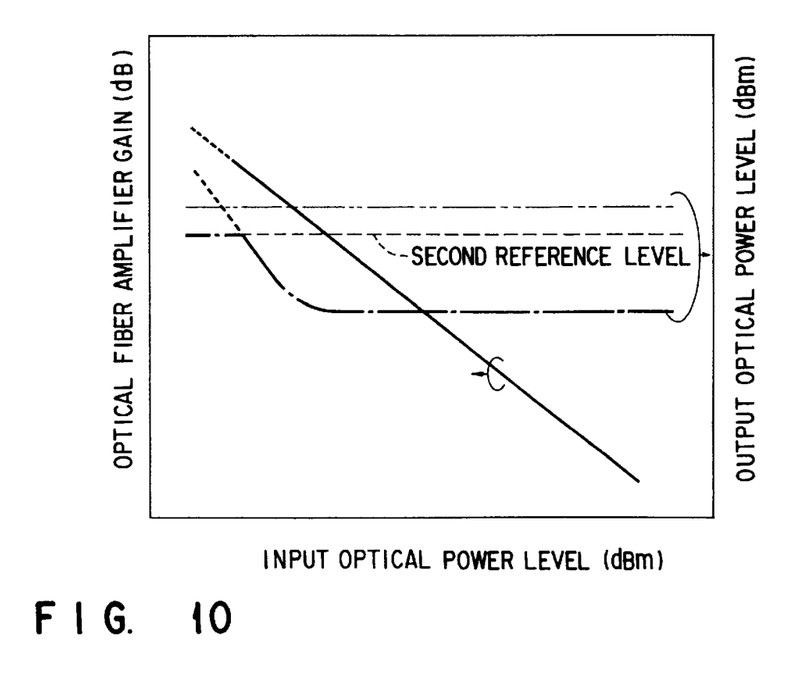
FIG. 10 is a characteristic view showing the relationship between an input optical power level and an optical fiber amplifier gain and the relationship between the input optical power level and an output optical power level in order to explain a gain control operation of the optical receiver circuit of the third embodiment of the present invention.
Figure 11:
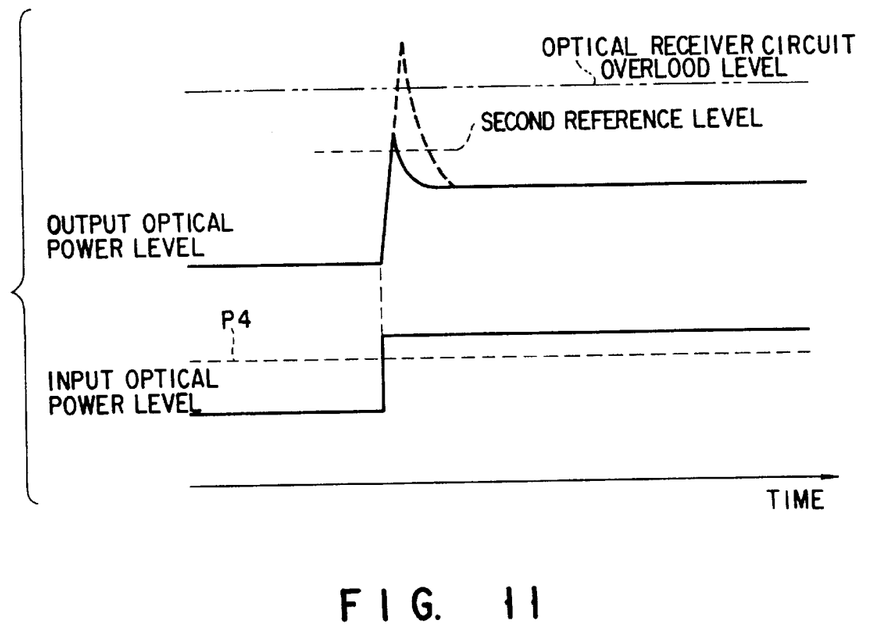
FIG. 11 a view showing a power level waveform of optical input signal and that of optical output signal in order to explain the gain control operation of the third embodiment of the present invention.

The following will explain the third embodiment of the present invention with reference to FIGS. 9 to 11.

FIG. 9 shows the structure of the optical receiver of the present invention. The optical receiver comprises an optical receiver circuit 300 and the data regeneration circuit 700. In FIG. 9, the same reference numerals are added to the portions common to FIGS. 5 and 7, only the portions, which are different from FIGS. 5 and 7, will be explained.

An optical signal input to the optical receiver circuit 300 is supplied to the optical fiber amplifier 1. A pump laser drive current is controlled by a gain control circuit 18 to be described later. The optical fiber amplifier 1 amplifies the optical input signal based on an arbitrary gain so as to be output as the optical splitter 14 as an optical output signal. The optical splitter 14 divides a part of the optical output signal to be coupled to the output level detection circuit 15. On the other hand, the passed optical output signal is guided to the optical detector 2.

The output level detection circuit 15 converts the optical output signal divided by the optical splitter 14 to an electrical signal. Then, the output level detection circuit 15 detects the power level of the optical output signal so as to be output to the gain control circuit 18 as an output optical power level signal.

On the other hand, an inverse bias voltage is applied onto the optical detector 2 by the bias circuit 3, and the optical output signal passed through the optical divider 14 is converted to an electrical signal so as to be supplied to the equalization amplifier 4. The equalization amplifier 4 amplifies the electrical signal up to a necessary level so as to be supplied to the data regeneration circuit 700 and the peak detection circuit 7 as a received signal.

The peak detection circuit 7 detects a peak level of the received signal so as to be output to the error amplification circuit 9 as a peak detection circuit. The error amplification circuit 9 obtains an error between a predetermined first reference level and the level of the peak detection signal. Then, the error amplification circuit 9 amplifies the error signal so as to be output to a gain control circuit 18.

The gain control circuit 18 controls the gain of the optical fiber amplifier 1 such that the error signal becomes zero. When the output optical power level signal sent from the output level detection circuit 15 is higher than a predetermined second reference level, the gain control circuit 18 controls the gain of the optical fiber amplifier 1 such that the output optical power level is lower than the second reference level.

In other words, the optical receiver circuit 300 comprises a first feedback loop for controlling the gain of the optical fiber amplifier 1 such that the peak level of the received signal is fixed (first reference level), and a second feedback loop for controlling the gain of the optical fiber amplifier 1 such that the output optical power level is lower than the second reference level. The first feedback loop comprises optical fiber amplifier 1, optical splitter 14, optical detector 2, equalization amplifier 4, peak detection circuit 7, error amplification circuit 9, and gain control circuit 18. The second feedback loop comprises optical fiber amplifier 1, optical splitter 14, output level detection circuit 15, and gain control circuit 18.

In this case, in consideration of a response speed to the optical input signal of the optical fiber amplifier 1, control speed of the second feedback loop is set to be fast enough.

The following will explain a gain control operation of the above-structured optical receiver circuit 300 with reference to FIGS. 10 and 11.

In FIG. 10, a solid line shows an optical fiber amplifier gain (dB) 1 against an input optical power level (dBm) of the optical receiver circuit 300, and dot-dash line shows a change of the output optical power level of the optical fiber amplifier 1 against the input optical power level. Also, two-dotted chain line shows the optical receiver circuit overload level 300.

The optical signal input to the optical receiver circuit 300 is amplified by the first feedback loop based on the gain by which the received signal whose peak level is fixed (first reference level) can be obtained. Then, as shown by dot-dash line of FIG. 10, the output optical power level is substantially fixed.

Even if the power level is slightly lower than the normally usable level, the optical signal is amplified by the first feedback loop based on the gain by which the received signal whose peak level is fixed. Moreover, according as the input optical power level decreases, an optical noise rate increases. Due to this, the output optical power level rises as shown by dot-dash line of FIG. 10.

When the output optical power level is higher than the second reference level, the second feedback loop detects such a state, and controls the gain of the optical fiber amplifier 1 such that the output optical power level is lower than the second reference level.

Moreover, even in a case where an optical surge is generated from the optical fiber amplifier, or a case where the optical input signal is accidentally input from the input signal loss as shown in FIG. 11, the following operation is executed since the control speed of the second feedback loop is set to be high as mentioned above. More specifically, when the output optical power level is higher than the second reference level, the second feedback loop detects the above state, and controls the gain of the optical fiber amplifier 1 such that the output optical power level is lower than the optical receiver circuit overload level 300 faster than the first feedback loop.

Thus, in the above-structured optical receiver circuit 300, even if an amount of noise is increased due to the reduction of the optical input signal and the power level of the output optical rises, the output power level does not exceed the optical receiver circuit overload level 300.

Furthermore, even in a case where an optical surge is generated from the optical fiber amplifier for some reason, or a case where the optical input signal is accidentally input from the input signal loss, the second feedback loop detects the rise of the output optical power level before exceeding the optical receiver circuit overload level 300 so as to control the gain of the optical fiber amplifier 1. Due to this, the output power level does not exceed the optical receiver circuit overload level 300. As compared with the conventional case, the rise of the output optical power level can be controlled in a short period of time. Due to this, the optical receiver circuit 300 is not damaged, and the circuit can be operated again without being influenced by saturation of the circuit.

The present invention is not limited to the above third embodiment. The above embodiment explained that the power level of the optical output signal of the optical fiber amplifier 1 was detected so as to control the gain of the optical fiber amplifier 1. However, the power level of the optical input signal of the optical fiber amplifier 1 may be detected so as to control the gain. Therefore, it is needles to say that the gain of the optical fiber amplifier 1 can follow the abrupt increase in the optical input signal.

Figure 12:
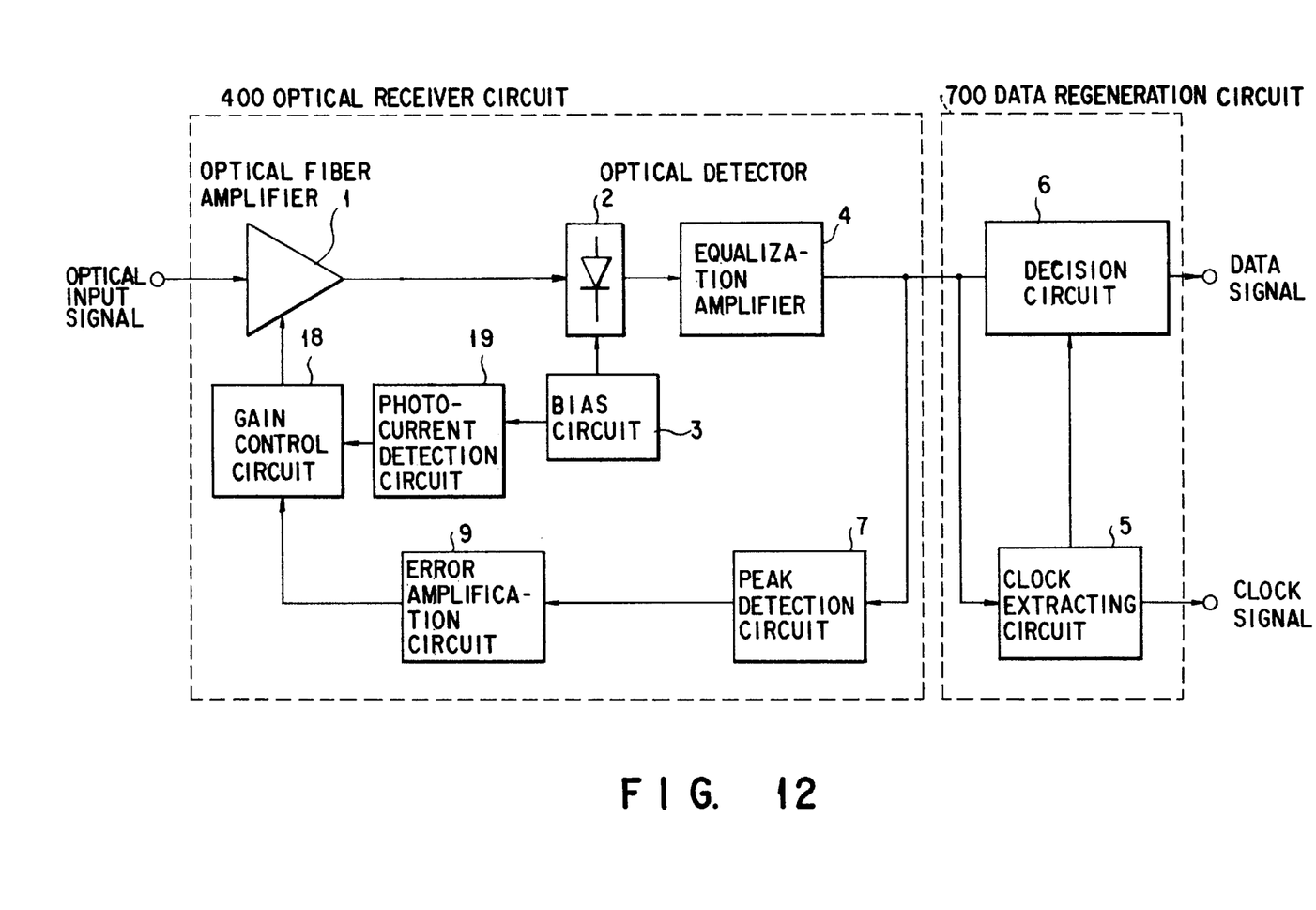
FIG. 12 is a block circuit diagram showing the structure of a modification of the third embodiment of the present invention.

Moreover, an optical current flowing to the optical detector 2 from the bias circuit 3 is changed in accordance with the power level of the optical output signal supplied from the optical detector 2. FIG. 12 shows the structure of an optical receiver circuit 400 using the above feature.

In the optical receiver circuit 400, in place of the optical splitter 14 and the output level detection circuit 15 of the optical receiver circuit 300, a photocurrent detection circuit 19 is provided between the bias circuit 3 and the gain control circuit 18. The photocurrent detection circuit 19 detects the output optical power level from the optical current so as to be output to the gain control circuit 18 as an output optical power level signal. By the above-mentioned structure, the same advantage as the case of the third embodiment can be obtained.

(Fourth Embodiment)

Figure 13:
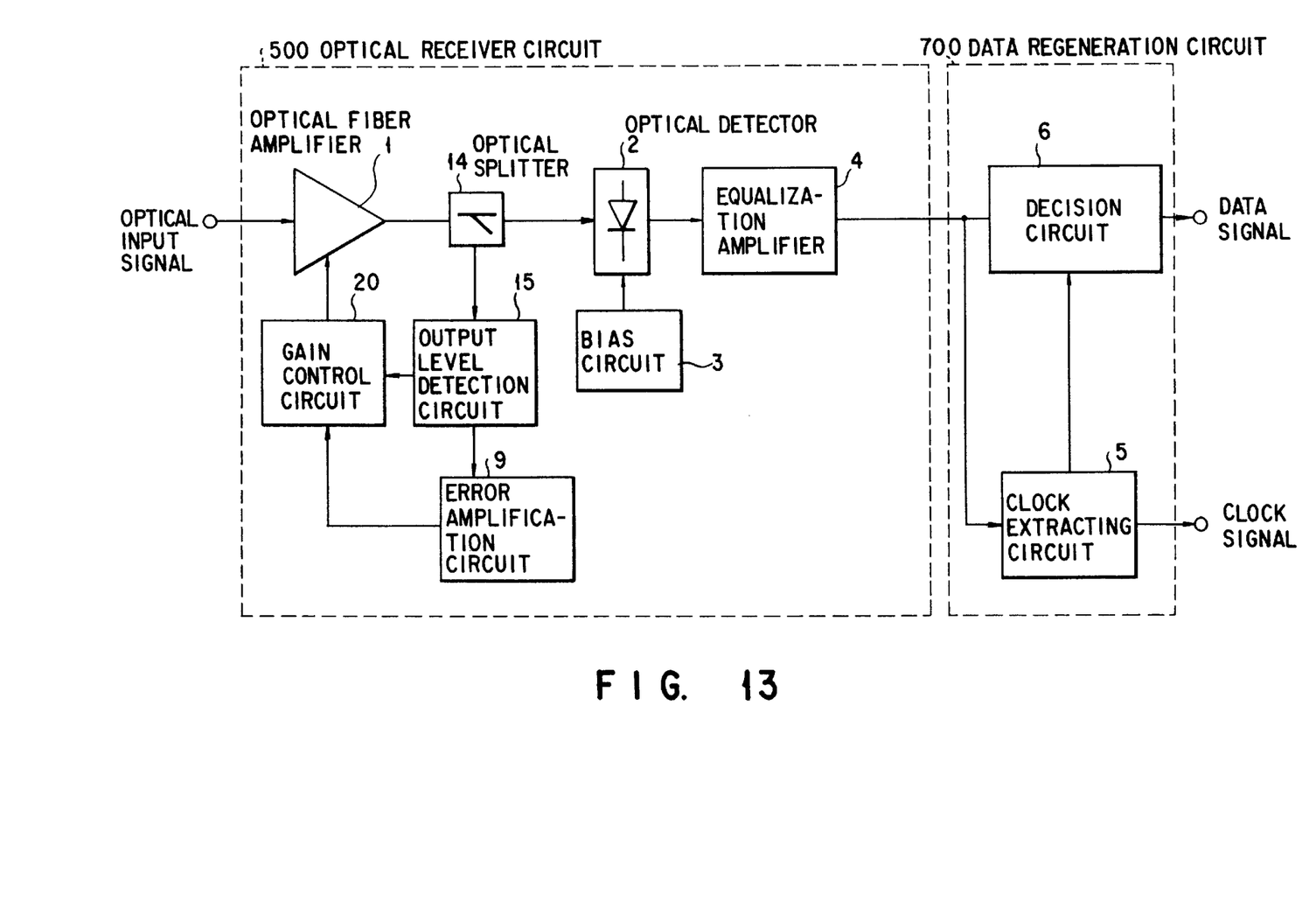
FIG. 13 is a block circuit diagram showing the structure of an optical receiver having an optical receiver circuit of a fourth embodiment of the present invention.
Figure 14:
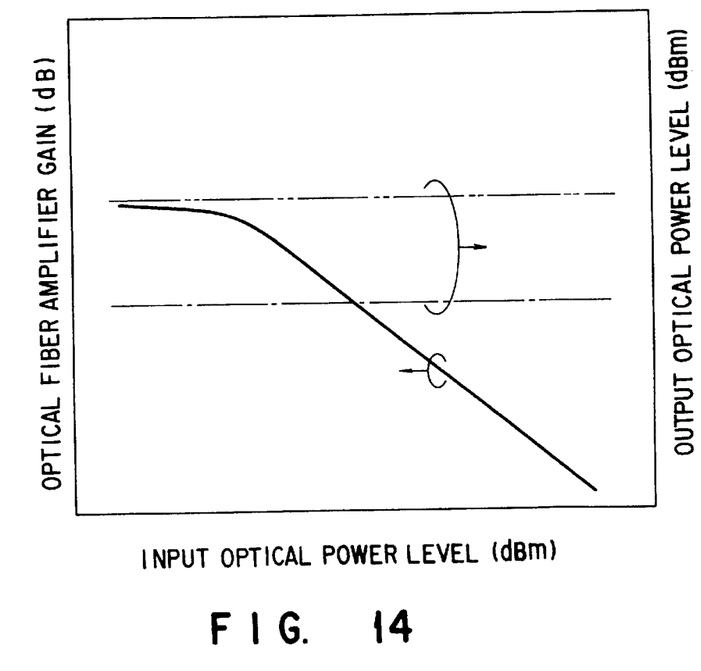
FIG. 14 is a characteristic view showing the relationship between an input optical power level and an optical fiber amplifier gain and the relationship between the input optical power level and an output optical power level in order to explain a gain control operation of the optical receiver circuit of the fourth embodiment of the present invention.

The following will explain the fourth embodiment of the present invention with reference to FIGS. 13 and 14.

FIG. 13 shows the structure of the optical receiver of the present invention. The optical receiver comprises an optical receiver circuit 500 and the data regeneration circuit 700. In FIG. 13, the same reference numerals are added to the portions common to FIGS. 5, 7, and 9, only the portions, which are different from FIGS. 5, 7, and 9 will be explained.

A optical signal input to the optical receiver circuit 500 is supplied to the optical fiber amplifier 1. A pump laser drive current is controlled by a gain control circuit 20 to be described later. The optical fiber amplifier 1 amplifies the optical input signal based on an arbitrary gain so as to be output as the optical splitter 14 as an optical output signal. The optical splitter 14 divides a part of the optical output signal to be guided to the output level detection circuit 15. On the other hand, the passed optical output signal is coupled to the optical detector 2.

An inverse bias voltage is applied onto the optical detector 2 by the bias circuit 3, and the optical output signal passed through the optical divider 14 is converted to an electrical signal so as to be supplied to the equalization amplifier 4. The equalization amplifier 4 amplifies the electrical signal up to a necessary level so as to be supplied to the data regeneration circuit 700.

On the other hand, the output level detection circuit 15 converts the optical output signal divided by the optical splitter 14 to an electrical signal. Then, the output level detection circuit 15 detects the power level of the optical output signal so as to be output to an error amplification circuit 9 and a gain control circuit 20 as an output optical power level signal.

The error amplification circuit 9 obtains an error between the output optical power level signal and a predetermined third reference level. Then, the error signal is amplified so as to be output to the gain control circuit 20. The gain control circuit 20 controls the gain of the optical fiber amplifier 1 such that the error signal becomes zero. When the output optical power level signal is higher than a predetermined fourth reference level, the gain control circuit 20 controls the gain of the optical fiber amplifier 1 such that the output optical power level is lower than the fourth reference level.

In other words, the optical receiver circuit 500 comprises a third feedback loop for controlling the gain of the optical fiber amplifier 1 such that the power level of the output optical becomes the third reference level, and a second feedback loop for controlling the gain of the optical fiber amplifier 1 when the output optical power level exceeds the fourth reference level. The third feedback loop comprises optical fiber amplifier 1, optical splitter 14, output level detection circuit 15 error amplification circuit 9, and gain control circuit 20. The fourth feedback loop comprises optical fiber amplifier 1, optical splitter 14, output level detection circuit 15, and gain control circuit 20.

In this case, in consideration of a response speed to the optical input signal of the optical fiber amplifier 1, control speed of the fourth feedback loop is set to be fast enough.

The following will explain a gain control operation of the above-structured optical receiver circuit 500 with reference to FIG. 14.

In FIG. 14, a solid line shows an optical fiber gain (dB) 1 against an input optical power level (dBm) of the optical receiver circuit 500, and dot-dash line shows a change of the output optical power level of the optical fiber amplifier 1 against the input optical power level. Also, two-dashed chain line shows the optical receiver circuit overload level 500.

A optical signal input to the optical receiver circuit 500 is amplified by the third feedback loop based on the third reference level such that the output optical power level is fixed as shown by dot-dash line of FIG. 14 regardless of intensity of the input optical power level. In this case, according as the input optical power level decreases, the gain of the optical fiber amplifier 1 is controlled as shown by the solid line of FIG. 14.

Moreover, even in a case where an optical surge is generated from optical fiber amplifier, or a case where the optical input signal is accidentally input the following operation is executed. More specifically, when the output optical power level is higher than the fourth reference level, the fourth feedback loop immediately detects the above state, and controls the gain of the optical fiber amplifier 1 such that the output optical power level is lower than the optical receiver circuit overload level 500.

Thus, in the above-structured optical receiver circuit 500, the power level of output optical is fixed even if the optical input signal is reduced. Due to this, the output power level does not exceed the optical receiver circuit overload level 500.

Furthermore, similar to the optical receiver circuit 300 of the third embodiment, even in a case where an optical surge is generated from optical fiber amplifier signal for some reason, or a case where the optical input signal is accidentally input from the input signal loss for some reason, the fourth feedback loop detects the rise of the output optical power level before exceeding the optical receiver circuit overload level 500 so as to control the gain of the optical fiber amplifier 1. Due to this, the output power level does not exceed the optical receiver circuit overload level 500. As compared with the conventional case, the rise of the output optical power level can be controlled in a short period of time. Due to this, the optical receiver circuit 500 is not damaged, and the circuit can be operated again without being influenced by saturation of the circuit.

The present invention is not limited to the above fourth embodiment. The above embodiment explained that the power level of the optical output signal of the optical fiber amplifier 1 was detected so as to control the gain of the optical fiber amplifier 1. However, the power level of the optical input signal of the optical fiber amplifier 1 may be detected so as to control the gain. Therefore, it is needless to say that the gain of the optical fiber amplifier 1 can follow the abrupt increase in the optical input signal.

Furthermore, the above-mentioned embodiments explained that the pump laser drive current of the optical fiber amplifier 1 was changed so as to control the gain. Even if the gain control is executed by the other methods or a semiconductor optical fiber amplifier using a semiconductor as an amplifying medium is used, the same advantage as the present invention can be obtained.

As mentioned above, according to the present invention, there is provided an optical receiver circuit in which damage of an optical detector and saturation of the optical detector can be prevented such that an output level of an optical signal output from an amplifier does not exceed a maximum optical receiving level of an optical detector even in a case where a power level of an optical input signal abruptly increases level or even in a case where the power level of the optical input signal is reduced, thereby the optical receiver circuit can be operated again.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical receiver circuit comprising:

an optical amplifer for amplifying an optical input signal;

photoelectric converting means for converting an optical signal output from said optical amplifier to an electrical signal;

first gain control means for detecting a level of the electrical signal output from said photoelectric converting means to control the gain of said optical amplifier such that the detected level of the electrical signal is set to a predetermined level;

optical input signal loss detecting means for detecting said input signal loss of said optical input signal; and second gain control means for controlling the gain of said optical amplifier to be lower the a maximum gain when said optical input signal loss detecting means detects the input signal loss;

wherein said first gain control means comprises peak level detecting means for detecting a peak level from the electrical signal output from said photoelectric converting means, and said first gain control means controls the gain of said optical amplifier such that the peak level detected by said peak level detecting means is set to a predetermined level.

2. The optical receiver circuit according to claim 1, wherein said optical input signal loss detecting means detects that the peak level detected by said peak level detecting means is lower than a first reference level, and outputs a detected result as an input signal loss.

3. The optical receiver circuit accordiing to claim 2, wherein said optical input signal loss detecting means detects the peak level detected by said peak level detecting means as all input signal loss until the peak level detected by said peak level detecting means reaches a second reference level higher than said first reference level.

4. An optical receiver circuit comprising:

an optical amplifier for amplifying an optical input signal;

photoelectric converting means for converting an optical input signal output from said optical amplifier to an eletrical signal;

first gain control means for detecting a level of the electrical signal output from said photoelectric converting means to control the gain of said optical amplifier such that the detected level of the electrical signal is set to a predetermined level;

second gain control means for controlling the gain of said optical amplifier to be lower than a maximum gain when said optical input signal loss detecting means detects the input signal loss;

wherein said optical input signal loss detecting means detects the level of the electrical signal output from said photoelectric converting means is lower than a first reference level, and outputs the detected result as an input signal loss; and wherein said optical input signal loss detecting means detects the level of the eletrical signal output from said photoeletric converting means as an input signal loss until the level of the electrical signal reaches a second reference level higher than said first reference level.

5. An optical receiver circuit comprising:

an optical amplifier for amplifying optical input signals;

photoelectric converting means for converting an optical signal output from said optical ampilfier to an electrical signal;

first gain control means for detecting a level of the eletrical signal output from said photoelectric converting means to control the gain of said optical amplifier such that the detected level of the eletrical signal is set to a predetermined level;

optical input signal loss detecting means for detecting said input signal loss of said optical input signal; and second gain control means for controlling the gain of said optical amplifier to be lower than a maximum gain when said optical input signal loss detecting means detects the input signal loss;

wherein said optical signal loss detecting means detects that an intensity level of the optical input signal input to said optical amplifier is lower than a first reference level, and outputs the detected result as an input signal loss; and wherein said optical input signal loss detecting means detects the intensity level of the optical input signal input to said optical amplifier as an input signal loss until the intensity level of the optical input signal reaches a second reference level higher than said first reference level.

6. An optical receiver circuit comprising:

an optical amplifier for amplifying an optical input signal;

photoelectric converting means for converting an optical output from said optical amplifier to an electrical signal;

first gain control means for detecting a level of the electrical signal output from said photoeletric converting means to control the gain of said optical amplifier such that the detected level of the electrical signal is set to a predetermined level;

optical input signal loss detecting means for detecting said input signal loss of said optical input signal; and second gain control means for controlling the gain of said optical amplifier to be lower than a maximum gain when said optical input signal loss detecting means detects the input signal loss;

wherein said optical input signal loss detecting means detects the an intensity level of the optical input signal output from said optical amplifier is lower than a first reference level, and outputs the detected result as an input signal loss; and wherein said optical input signal loss detecting means detects the intensity level of the optical input signal output from said optical amplifier as an input signal loss until the intensity level of the optical input signal reaches a second reference level higher than said first reference level.

7. An optical receiver circuit comprising:

an optical amplifier for amplifying an optical input signal;

photoelectric converting means for converting an optical signal output from said optical amplifier to an electrical signal;

first gain control means for controlling the gain of said optical amplifier such that the output of said optical amplifier is set to a predetermined level;

optical input signal loss detecting means for detecting that the level of the electrical signal output from said photoelectric converting means is lower than a first reference level, and outputting the detected result as an input signal loss; and second gain control means for controlling the gain of said optical amplifier to be lower than a maximum gain when said optical input signal loss detecting means outputs the input signal loss.

8. The optical receiver circuit according to claim 7, wherein said optical input signal loss detecting means detects the level of the electrical signal output from said photoelectric converting means as an input signal loss until the level of the electrical signal reaches a second reference level higher than said first reference level.

9. The optical receiver circuit according to claim 7, wherein said first gain control means detects an intensity level of the optical output signal from said optical amplifier, and controls the gain of said optical amplifier such that the intensity level of the optical output signal is set to a predetermined level.

10. The optical receiver circuit according to claim 7, wherein said second gain control means controls the gain of said optical amplifier to be zero when said optical input signal loss detecting means outputs an optical input loss.

11. A optical receiver circuit comprising:

an optical amplifier for amplifying an optical input signal;

photoelectric converting means for converting an optical signal output from said optical amplifier to an electrical signal;

first gain control means for controlling the gain of said optical amplifier such that the output of said optical amplifier is set to a predetermined level;

optical intensity level detecting means for detecting an intensity level of the optical signal output from said optical amplifier; and second gain control means for controlling the gain of said optical amplifier so that the optical intensity level detected by said optical intensity level detecting means does not exceed a first reference level.

12. The optical receiver circuit according to claim 11, wherein said first gain control means detects the level of the electrical signal output from said photoelectric converting means, and controls the gain of said optical amplifier such that the level of the detected electrical signal is set to a predetermined level.

13. The optical receiver circuit according to claim 11, wherein said optical intensity level detecting means detects said optical intensity level from the optical output signal of said optical amplifier.

14. The optical receiver circuit according to claim 11, wherein said optical intensity level detecting means detects said optical intensity level from the optical output signal of said optical amplifier.

15. The optical receiver circuit according to claim 11, wherein said optical intensity level detecting means detects said optical intensity level from an amount of a photoelectric current flowing to said photoelectric converting means.

16. The optical receiver circuit according to claim 11, wherein said first gain control means detects the intensity level of the optical output signal output from said optical amplifier, and controls the gain of said optical amplifier such that the intensity level of the detected optical output signal is set to a predetermined level.

17. The optical receiver circuit according to claim 11, wherein said optical intensity level detecting means detects the optical intensity, level from the optical input signal of said optical amplifier.

* * * * *